Jan. 25, 1938.                    W. D. ALLISON                    2,106,291
                                 WHEEL SUSPENSIONS
                                Filed Nov. 7, 1935                3 Sheets-Sheet 1
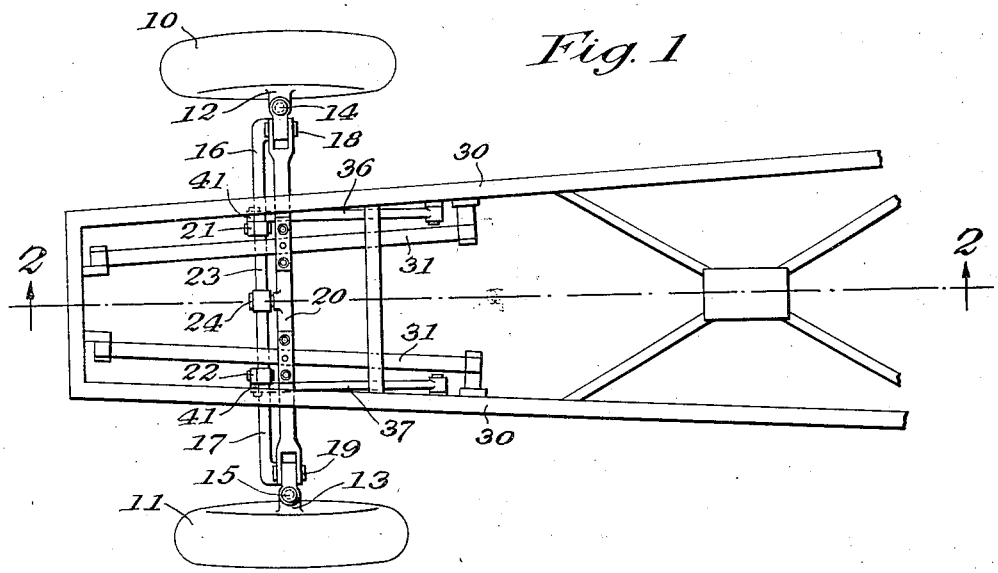
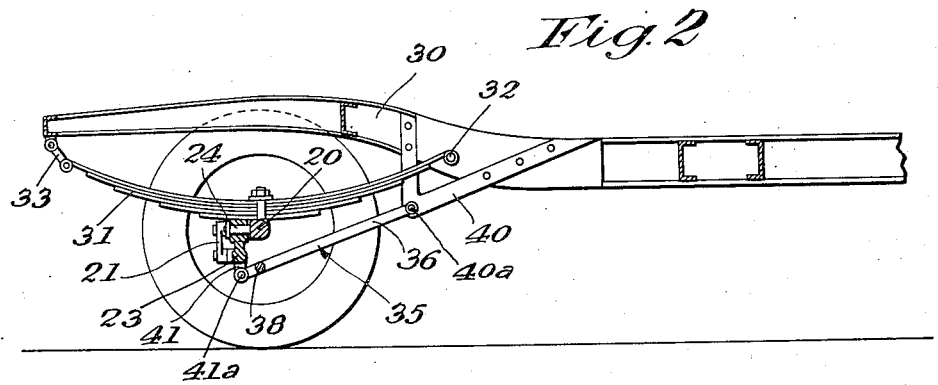
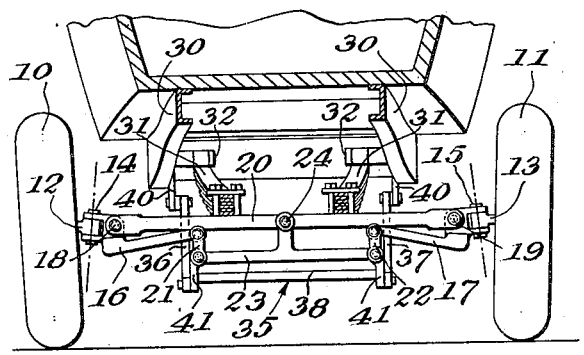
Inventor:
William D. Allison
By Dike, Calver and Gray
Attorneys.

Jan. 25, 1938.  W. D. ALLISON  2,106,291
WHEEL SUSPENSIONS
Filed Nov. 7, 1935   3 Sheets-Sheet 2
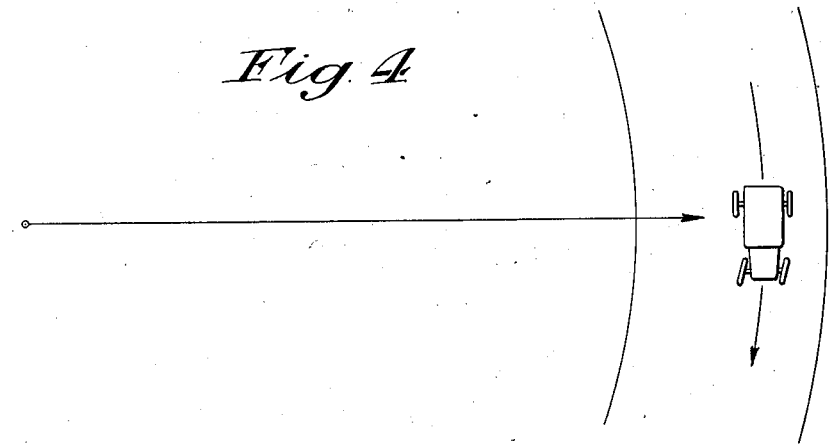
Fig. 4
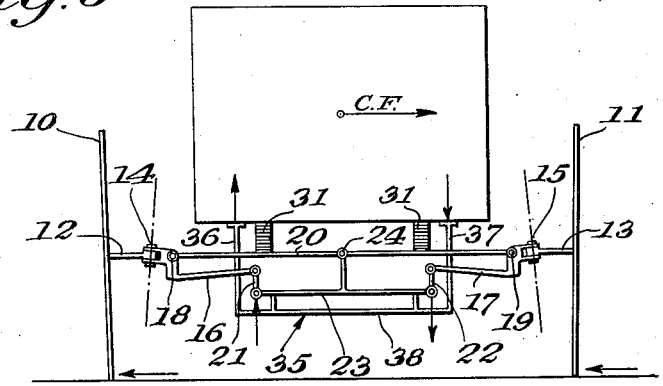
Fig. 5
Fig. 6
Inventor:
William D. Allison
By Dike, Calver and Gray
Attorneys.

Jan. 25, 1938. W. D. ALLISON 2,106,291
WHEEL SUSPENSIONS
Filed Nov. 7, 1935  3 Sheets-Sheet 3

INVENTOR
William D. Allison
BY
Dike, Colver & Gray
ATTORNEY

Patented Jan. 25, 1938

2,106,291

UNITED STATES PATENT OFFICE 2,106,291

WHEEL SUSPENSIONS

William D. Allison, Detroit, Mich., assignor to Hudson Motor Car Company, Detroit, Mich., a corporation of Michigan Application November 7, 1935, Serial No. 48,651

15 Claims. (Cl. 280—112)

In the construction of vehicles in general and particularly automobiles, it is common practice to employ springs to support the body or chassis frame upon the axles which rotatably carry the wheels. The primary purpose of these springs is to absorb vertically directed forces acting upon the wheels and caused by irregularities in the road or other surface over which the wheels travel, thus reducing the intensity of such forces before they are transmitted to the body.

However, inasmuch as in conventional constructions the springs provide substantially the only structural connection between the chassis frame and the vehicle wheels, they must perform other necessary functions. For example, the springs must withstand forces caused by accelerating and decelerating the vehicle. Furthermore, when a vehicle is subjected to a transverse force, such as a heavy cross wind, or to the action of centrifugal force due to movement of the vehicle in a curved path, the chassis frame and body tend to roll or tip about a longitudinal axis thus compressing the springs at one side of the vehicle. These factors must be considered when designing vehicle springs. Consequently, the springs must be constructed so stiff and strong that they cannot perform their primary function as completely as desired.

The present invention provides a vehicle construction in which the body and chassis frame are supported upon the axles by springs which carry the weight of the body and chassis frame, other means being provided for resisting forces tending to produce body roll. The means for resisting forces tending to produce body roll may be arranged so as to relieve the springs from the action of forces caused by accelerating and decelerating the vehicle. Consequently, the construction of the invention permits the use of soft springs. Furthermore, the construction may be such as to eliminate front axle roll and maintain a constant caster angle thus providing ideal steering geometry. In its more specific aspect, the invention contemplates a construction such that a transverse force acting upon the wheels in opposition to and as a result of a transverse force acting upon the vehicle, such as that due to the action of centrifugal force, is converted to vertical force acting upon the chassis frame to oppose body roll.

The invention will be more clearly understood from the following description in conjunction with the accompanying drawings, in which Fig. 1 is a plan view of the front portion of a vehicle chassis;

Fig. 2 is a sectional view taken upon the line 2—2, Fig. 1;

Fig. 3 is a front view of the same, partly broken away;

Fig. 4 is a diagrammatic view illustrating a vehicle moving in a curved path;

Fig. 5 is a diagrammatic front elevational view of a vehicle embodying the invention illustrating the relation of the parts as the vehicle is moving in the curved path illustrated in Fig. 4;

Fig. 6 is a diagrammatic side elevational view illustrating the relation of the parts when the vehicle is being decelerated;

Figure 7:
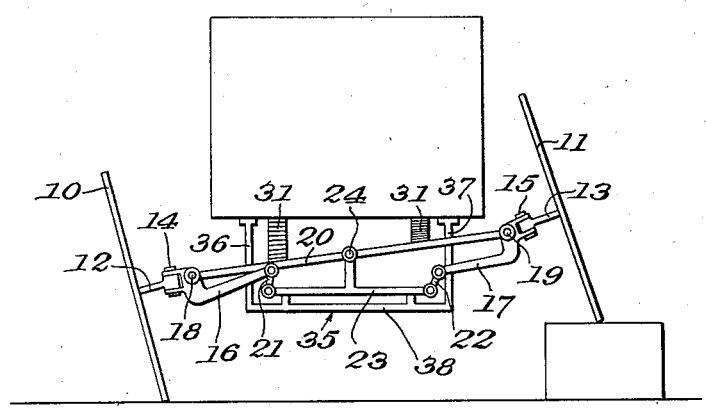
Fig. 7 is a diagrammatic view illustrating a vehicle wheel passing over an elevation.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The front portion of a vehicle embodying the invention is illustrated in the accompanying drawings and comprises a pair of front wheels 10 and 11 rotatably mounted upon spindles 12 and 13, respectively. The inner ends of the spindles 12 and 13 are mounted for rotation upon pintles 14 and 15 carried in the outer forked ends of bell crank levers or spindle carriers 16 and 17 respectively. The levers or spindle carriers 16 and 17 are rotatably mounted at intermediate points upon pintles 18 and 19 fixed in opposite forked ends of a transverse load-carrying member or bar 20. The pintles 18 and 19 extend in a substantially longitudinal horizontal direction which permits rotation of the bell crank levers 16 and 17 in a substantially vertical plane. The inner ends of the bell crank levers 16 and 17, which form end axle sections, are pivotally connected to the upper ends of links 21 and 22 respectively, the other ends of which are pivotally connected to the opposite ends of a central axle member or stabilizer beam 23. The latter has centrally thereof a right angular extension which is pivotally connected by a pintle 24 to the load-carrying bar 20. The chassis frame 30 is supported upon the bar 20 by a pair of springs 31 which are fixed thereto by suitable spring pads and bolts and pivotally connected at their ends to the chassis frame by pintles 32 and shackles 33.

A rigid frame or rack 35 comprising longitudinal members 36 and 37 and a transverse member 38 provides a connection between the chassis frame 30 and the stabilizer member 23. For this purpose the rear ends of the longitudinal members 36 and 37 are pivotally connected at 40a to brackets 40 secured to and depending from opposite sides of the chassis frame 30 and the forward ends of the longitudinal members 36 and 37 are pivotally connected at 41a to projections 41 depending from opposite ends of the stabilizer member 23.

From the foregoing it will be seen that the load carrying member 20, the stabilizer beam 23, the bell cranks or spindle carriers 16 and 17, the rigid rack or frame 35 together with associated parts may be considered for convenience the axle or axle assembly as a whole.

When a vehicle embodying the invention is moving along a curved path, as illustrated in Figs. 4 and 5, it is subjected to the action of centrifugal force acting transversely, as indicated by the arrow in Fig. 5, and tending to roll the body. As a result of the action of centrifugal force, the longitudinal members 36 and 37 of the rigid frame or rack 35 are subjected to the action of vertical forces, as indicated by the arrows in Fig. 5, which tend to rotate the stabilizer member 23 in a clockwise direction as viewed in Fig. 5. As a result of the tendency to rotate the member 23 in this direction, the inner ends of the bell crank levers 16 and 17 are subjected to forces tending to rotate them in a counter-clockwise direction.

As a result of the action of centrifugal force upon the vehicle or a similar force acting transversely of the vehicle, such as would be produced by a heavy cross wind, an opposed transverse force is set up acting upon the wheels at their point of contact with the road, as indicated by the arrows in Fig. 5. The transverse forces thus set up tend to rotate the bell crank levers 16 and 17 in a clockwise direction which applies forces at the opposite ends of the stabilizer member 23 tending to rotate the latter in a counter-clockwise direction. This tendency of the member 23 to rotate in a counter-clockwise direction subjects the rigid frame 35 to vertical forces opposed to the vertical forces to which it is subjected as a direct result of the action of centrifugal force. Inasmuch as the frame 35 forms a rigid connection for transmitting vertical forces between the chassis frame 30 and the stabilizer member 23, these members will always be maintained in parallel relation and inasmuch as the opposed vertical forces acting upon the frame 35 are equal, body roll due to centrifugal force will be eliminated.

Moreover, when one wheel 11 of the axle assembly passes over an elevation or depression in the road surface, the camber of both wheels may change, allowing the body to remain approximately parallel to its original position. This action is illustrated in Fig. 7.

Figure 8:
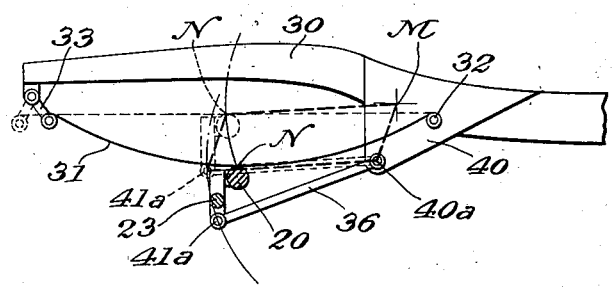
Fig. 8 is a detail side elevation illustrating the parallelogram action hereinafter described.

Since the arc described by a conventional semi-elliptic spring, as the spring 31, at its point of attachment N (Fig. 8) to an axle, such as bar 20 in its normal operating range is approximately a section of a circle whose center is somewhat forward and slightly above the spring eye connection 32, as at point M in Fig. 8, the length of each member 36 and 37 is therefore preferably substantially equal to the radius of this circle. Moreover, as illustrated in Fig. 8, the points of attachment 40a and 41a of the rigid frame 35 to the chassis frame and to the stabilizer member 23 and the points M and N are preferably arranged so that straight lines connecting these four points form substantially a parallelogram. With this arrangement it will be seen that a constant caster angle of the load carrying bar 20 relative to the frame of the vehicle will be maintained regardless of load or axle position.

It will also be noted that any forces applied to the vehicle wheel tending to produce front axle roll such as forces produced as the result of acceleration or deceleration of the vehicle wheels will be resisted by the rigid frame 35. Thus, if the vehicle is moving in the direction indicated by the arrow at the top of Fig. 6 and the motion of the wheels is decelerated, a force will be applied to the wheels as indicated by the arrow at the bottom of Fig. 6 tending to roll the front axle assembly in the direction of the curved arrow. This tendency will be opposed by a couple consisting of a compression force transmitted through the rigid frame 35 and a tension force transmitted by the springs 31. In decelerating the vehicle from a velocity in a reverse direction the direction of the forces in the rigid frame 35 and springs will of course be reversed.

By thus eliminating axle roll and maintaining a constant caster angle ideal steering geometry is achieved. It will also be noted that the load-carrying member 20 prevents the camber of the wheels from being changed by variations in load imposed upon the chassis frame.

I claim:

1. In a vehicle having an axle supported in raised position by a pair of wheels, a chassis frame, resilient means for supporting said chassis frame upon said axle, said axle including mechanism for converting horizontal transverse forces applied to said wheels at their areas of contact with the road to vertical forces, and means for transmitting said vertical forces to said chassis frame independently of the resilient means.

2. In a vehicle having an axle supported in raised position by a pair of wheels, a chassis frame, resilient means for supporting said frame upon said axle, said axle comprising mechanism for converting a horizontal transverse force applied to one of said wheels at its area of contact with the road to a vertical force and said mechanism including a stabilizer member mounted on a part of the axle for rotation about a longitudinal substantially horizontal axis and a rigid frame pivotally connected at transversely spaced points to said chassis frame and pivotally connected at transversely spaced points to said stabilizer member.

3. In a vehicle, a load carrying member, end axle sections pivotally mounted upon said member, a wheel rotatably carried at the outer end of each of said sections, a stabilizer bar pivotally connected at its ends to the inner ends of said end axle sections, a chassis frame, resilient means for supporting said frame upon said load carrying member, and a rigid frame pivotally connected at transversely spaced points to said chassis frame and pivotally connected at transversely spaced points to said bar.

4. In a vehicle having an axle supported in raised position by a pair of wheels, a chassis frame, spring means for supporting said frame upon the axle, said axle including a load carrying member, a stabilizer member mounted on said load carrying member to turn about a longitudinal substantially horizontal axis, and mechanism cooperating with said load carrying member and stabilizer member tending to maintain the latter parallel to the chassis frame and for converting a horizontal transverse force applied to one of said wheels at its area of contact with the road to a vertical force.

5. In a vehicle having an axle supported in raised position by a pair of wheels, said axle comprising means for converting horizontal transverse forces applied to said wheels at their areas of contact with the road to vertical forces including a load carrying member resiliently supporting the chassis frame, a stabilizer member pivoted to the load carrying member to turn about a longitudinal substantially horizontal axis, a rigid frame pivotally connected at transversely spaced points to said chassis frame and pivotally connected at transversely spaced points to said stabilizer member, and wheel spindle carriers of bell crank construction connecting said stabilizer and load carrying members together.

6. In a vehicle having a chassis frame and a pair of wheels, a transverse load carrying member connecting said wheels, spring means interposed between the load carrying member and chassis, a rockable stabilizer bar pivoted centrally to said member and mechanism for transmitting to said stabilizer bar transverse horizontal forces applied to the wheels at their points of contact with the road and for converting said forces into vertical forces applied to the chassis frame.

7. In a vehicle having a chassis frame and a pair of wheels, a transverse load carrying member connecting said wheels, spring means interposed between the load carrying member and chassis, a rockable stabilizer bar pivoted centrally to said member, mechanism including bell crank levers for transmitting to said stabilizer bar transverse horizontal forces applied to the wheels at their points of contact with the road and for converting said forces into vertical forces, and a frame for transmitting said vertical forces to the chassis frame.

8. In a vehicle having a chassis frame and an axle supported in raised position by a pair of wheels, said axle comprising means for converting horizontal transverse forces applied to said wheels at their areas of contact with the road to vertical forces including a transverse load carrying member resiliently supporting said chassis frame and means for transmitting said vertical forces to said chassis frame independently of said load carrying member.

9. In a vehicle having a chassis frame and an axle supported in raised position by a pair of wheels, said axle comprising means for converting horizontal transverse forces applied to said wheels at their areas of contact with the road to vertical forces including a load carrying member resiliently supporting said chassis frame, a stabilizer member connected to said load carrying member for rotation about a longitudinal substantially horizontal axis, and means tending to maintain said chassis frame and said stabilizer member parallel.

10. In a vehicle having an axle supported in raised position by a pair of wheels, said axle comprising means for converting horizontal transverse forces applied to said wheels at their areas of contact with the road to vertical forces including a load carrying member resiliently supporting the chassis frame, a stabilizer member pivoted to the load carrying member to turn about a longitudinal substantially horizontal axis, and a rigid frame pivotally connected at transversely spaced points to said chassis frame and pivotally connected at transversely spaced points to said stabilizer member.

11. In a vehicle, a load carrying member, end axle sections, a wheel rotatably carried at the outer end of each of said sections, a stabilizer bar, oscillatable levers connecting said axle sections and stabilizer bar and pivoted to the ends of said load carrying member, a chassis frame, resilient means for supporting said frame upon said load carrying member, and means for connecting said stabilizer bar to the frame for transmitting vertical forces thereto.

12. In a vehicle having a body, a pair of wheels, a transverse load carrying member, levers pivotally connected to said member and to the wheels for converting transverse horizontal forces at points of contact of the wheels to the road to vertical forces, and means for transmitting said vertical forces to opposite sides of the body independently of said load carrying member.

13. In a vehicle having a body, a pair of wheels, a transverse load carrying member, levers pivotally connected to said member and to the wheels for converting transverse horizontal forces at points of contact of the wheels to the road to vertical forces, and means for transmitting said vertical forces to opposite sides of the body, said means including a rockable stabilizer bar pivotally connected centrally thereof to said member.

14. In a vehicle having a body, a pair of wheels, a transverse load carrying member, levers pivotally connected to said member and to the wheels for converting transverse horizontal forces at points of contact of the wheels to the road to vertical forces, and means for transmitting said vertical forces to opposite sides of the body, said means including a rockable stabilizer bar pivotally connected centrally thereof to said member and rigid bars connecting the stabilizer bar to the body.

15. In a vehicle, a load carrying member, end axle sections, a wheel rotatably carried at the outer end of each of said sections, a stabilizer bar, oscillatable levers connecting said axle sections and stabilizer bar and pivoted to the ends of said load carrying member, a chassis frame, resilient means for supporting said frame upon said load carrying member, and means tending to maintain said chassis frame and said stabilizer bar parallel.

WILLIAM D. ALLISON.